United States Patent [19]

Ruff et al.

[11] Patent Number: 5,246,682
[45] Date of Patent: Sep. 21, 1993

[54] PROCESS FOR WASTE LIQUID-FREE PROCESSING OF CHLOROSILANE DISTILLATION RESIDUES WITH HYDROCHLORIC ACID

[75] Inventors: Klaus Ruff, Troisdorf; Bernhard Falk, Rheinfelden, both of Fed. Rep. of Germany

[73] Assignee: Hüls Aktiengesellschaft, Marl, Fed. Rep. of Germany

[21] Appl. No.: 928,941

[22] Filed: Aug. 11, 1992

[30] Foreign Application Priority Data

Aug. 13, 1991 [DE] Fed. Rep. of Germany ....... 4126670

[51] Int. Cl.$^5$ .................. C01B 33/00; C01B 33/08
[52] U.S. Cl. .................... 423/348; 210/712; 405/129; 423/488
[58] Field of Search ........... 423/342, 348, 488, 659; 405/129; 210/712

[56] References Cited

U.S. PATENT DOCUMENTS

| | | | |
|---|---|---|---|
| 5,066,472 | 11/1991 | Ruff et al. | 423/342 |
| 5,080,804 | 1/1992 | Ruff | 210/712 |
| 5,094,830 | 3/1992 | Tom et al. | 423/342 |
| 5,182,095 | 1/1993 | Ruff et al. | 423/659 |

*Primary Examiner*—Robert Kunemund
*Assistant Examiner*—Ken Horton
*Attorney, Agent, or Firm*—Felfe & Lynch

[57] ABSTRACT

A process for waste liquid-free processing of residues of chlorosilane distillations, wherein the residue is allowed to react with liquid hydrochloric acid accompanied by the release of hydrogen chloride, the resulting reaction mixture is allowed to coagulate, the solid phase is separated and dried and heat-treated, and the liquid phase and the condensed gaseous constituents are recycled into the process.

3 Claims, 1 Drawing Sheet

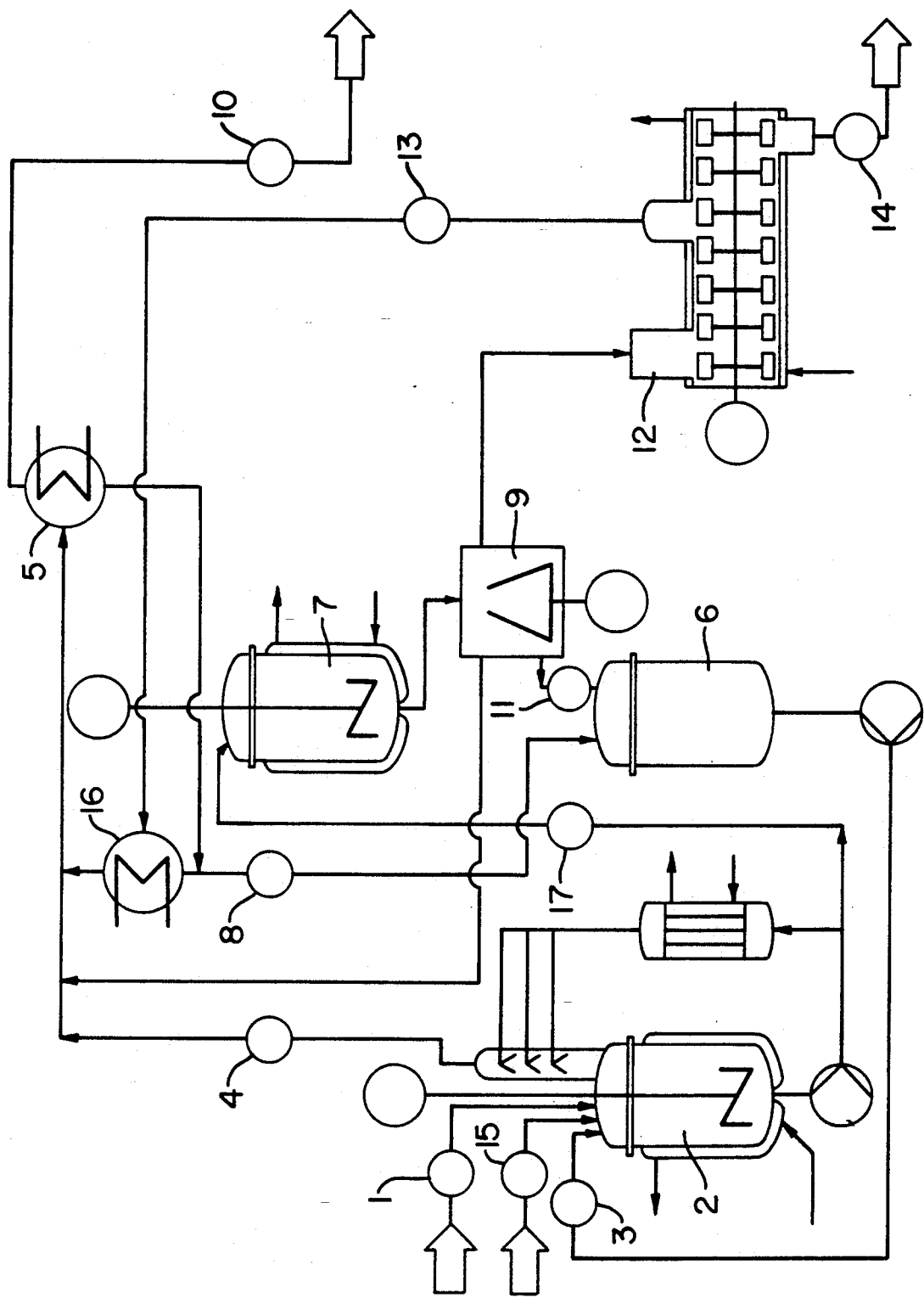

PROCESS FOR WASTE LIQUID-FREE PROCESSING OF CHLOROSILANE DISTILLATION RESIDUES WITH HYDROCHLORIC ACID

FIELD OF THE INVENTION

The present invention relates to a novel waste liquid-free method of processing of residues which are produced in the course of the distillation of chlorosilanes. The residues are reacted in the liquid phase with hydrochloric acid. The result of the novel method is a dry residue which has a low content of water-soluble chlorides, as is required for environmentally safe disposal.

BACKGROUND OF THE INVENTION

Chlorosilanes such as trichlorosilane and silicon tetrachloride can be prepared, for example, by reacting crude silicon with chlorine or hydrogen chloride. In the case of an industrial scale preparation, types of crude silicon whose silicon content is 85% by weight or more are usually employed as starting materials. Other constituents of crude silicon are mainly iron, aluminum, calcium and titanium, which are converted into their chlorides during the reaction with chlorine or hydrogen chloride. In addition to these metal chlorides, high-boiling compounds such as hexachlorodisiloxane and pentachlorodisiloxane are also produced.

Customarily, these residues are roughly separated from the chlorosilanes by distillation. Depending upon the distillation conditions, the distillation residue is present in the form of a suspension or as a solid and requires a separate processing step.

The distillation of the chlorosilanes is carried out as completely as possible, because any chlorosilanes which remain in the distillation residue can no longer be converted into useful products and therefore represent a loss in value. In those instances where the total residues to be disposed of are in the form of a suspension, this suspension has a typical composition of about 30 to 40% by weight aluminum chloride, 2 to 3% by weight iron chloride, 2 to 3% by weight titanium tetrachloride, 35 to 45% by weight hexa- and pentachlorodisiloxane, the remainder being silicon tetrachloride and about 1% by weight trichlorosilane. If such a suspension is pre-dried by evaporating the low-boiling components, for example continuously in a screw-conveyor dryer, a residue pre-dried in such a manner has a typical composition of about 80% by weight aluminum chloride and iron chloride, 16% by weight hexa- and pentachlorodisiloxane and titanium tetrachloride, and 4% by weight silicon tetrachloride.

German Patent No. 21 61 641 discloses the reaction of a chlorosilane distillation residue with water vapor accompanied by the formation of hydrogen chloride. However, an adequate reaction takes place only with a stoichiometric excess of water vapor, so that additional hydrochloric acid is produced from the unreacted water, which has to be disposed of.

In order to avoid the formation of additional hydrochloric acid, German Patent No. 36 42 285 proposes to perform the hydrolysis of the distillation residue in the presence of additional hydrogen chloride and to recirculate the unreacted water. According to German Offenlegungsschrift No. 37 42 614, an additional treatment with air can further reduce the residual chloride content in the hydrolysis residue.

All of these known processes are complicated and in some instances cause problems with liquid and gaseous waste products.

U.S. Pat. No. 4,690,810 discloses a process for the reaction of chlorosilanes with milk of lime, where the chlorosilanes contain up to 20% by weight of finely divided metals and between 0.1 and 5% by weight chlorides of aluminum, iron and titanium. A stream of chlorosilane is introduced by way of a dip tube into a milk of lime suspension which has a pH of at least 9 until the pH of the lime suspension drops to between 7 and 8. Since this process forms calcium chloride, the disposal problems are not solved but merely shifted to this reaction product.

German Patent No. 32 47 997 discloses a process for the purification of waste gas from the production of polycrystalline silicon in which chlorosilanes are washed out of a gas mixture containing hydrogen and hydrogen chloride with the aid of saturated hydrochloric acid. The hydrolysis products resulting from this treatment are obtained in the form of easily filterable solids. As is known, the chlorosilanes contained in the waste gas of such a plant are essentially dichlorosilane and trichlorosilane. The waste gas effluent contains about 1 g of silicon per m$^3$.

This prior art reference provides no guidelines for technical procedures with respect to processing of residues of a chlorosilane distillation, because only pure gaseous chlorosilanes, essentially dichlorosilane and trichlorosilane to be precise, are reacted at very low concentrations at which neither chlorodisiloxanes nor titanium tetrachloride nor aluminum chloride and iron chloride, which make up the largest part of the distillation residue, are present. Moreover, the reference does not disclose any method for the treatment of the separated hydrolysis product. If a typical residue of the distillation of chlorosilanes, which were prepared by reacting crude silicon with chlorine or hydrogen chloride, is continuously reacted with hydrochloric acid pursuant to this reference and it is attempted to continuously filter off the solids, this attempt fails because a reaction mixture prepared in this way simply cannot be filtered.

OBJECT OF THE INVENTION

It is an object of the present invention to provide a method for economically processing of residues of a chlorosilane distillation, which on one hand yields a waste product which can be readily disposed of, on the other completely and in an economically efficient manner recovers the chlorine contained in the residues without the formation of other products which in turn have to be disposed of. Such a process is particularly advantageous and desirable if the liberated chlorine can be obtained in the form of hydrogen chloride which can be immediately recycled into the main process for the hydrochlorination of crude silicon.

Other objects and advantages of the present invention will become apparent as the description thereof proceeds.

DESCRIPTION OF THE INVENTION

The above object is achieved with the aid of the novel method according to the present invention which proceeds without the formation of a liquid waste product and comprises the steps of a) allowing the chlorosilane distillation residue to react in liquid hydrochloric acid accompanied by the release of hydrogen chloride,
b) allowing the reaction mixture formed in step a) to coagulate,
c) removing the solid constituents of the coagulated reaction mixture and returning the liquid component to step a),
d) subjecting the moist solid components separated in step c) to a drying and heat treatment at a temperature of at least 140° C., and
e) condensing the gaseous products released in step d), and recycling the condensate into step a).

The hydrolysis of the chlorosilane distillation residue in liquid hydrochloric acid accompanied by the release of gaseous hydrogen chloride can be performed in any suitable reactor. If the reaction is carried out batchwise, normal stirring vessels are suitable. Advantageously, these vessels are equipped with a cooling jacket for removing the heat of reaction. The reaction should be carried out in a temperature range below 40° C. in order to keep the evaporating portion of the reaction mixture at a minimum. The generated gaseous hydrogen chloride is advantageously washed with reaction mixture in order to retain entrained residue solids, which is accomplished in simple manner by pumping the reaction mixture back into the reactor through a spray tower mounted on the stirring vessel. In this washing circulation an additional heat exchanger can be installed to control the heat of reaction, if needed.

After completion of the reaction, the reaction mixture is allowed to coagulate in order to facilitate the subsequent removal of the resulting solids from the liquid reaction mixture component. This step can be performed, for example, by simply allowing the reaction mixture to settle. Coagulation additives can also be used, such as SiO$_2$-containing additives, for example highly dispersed, less than technical grade silica, or furnace ash from the chlorosilane production.

This step is followed by the separation of the solids from the reaction mixture, for example by filtering or centrifuging. All conventional types of liquid-solid separation apparatus can be used for this purpose. The use of a centrifuge is particularly advantageous, because at high centrifuge speeds some of the hydrochloric acid evaporates, as a result of which the waste product obtained later has a lower residual chloride content than if the solids are separated from the liquid phase by filtering under otherwise identical conditions. The liquid phase which is recovered is collected and used over again for reaction with fresh distillation residue.

The separated moist solid is then heat-treated at elevated temperature. For this purpose the moist solid is introduced into mixer in which the heat treatment is carried out at temperatures above 140° C. accompanied by agitation of the solid. In the course of this treatment gaseous constituents escape which are fed into a condensation system. The condensate obtained thereby is recycled into the hydrolysis step for reaction with fresh distillation residue. The heat treatment in the mixing apparatus can be carried out batchwise or continuously. For this purpose all conventional types of apparatus which are used in drying technology can be employed.

The heat treatment conditions largely determine the residual chloride content of the waste product. Other factors which influence the residual chloride content are the conditions under which the solid is removed from the reaction mixture and the concentration of the distillation residue in the reaction mixture. A lower residual chloride content in the waste product is obtained by centrifuging the solid from the reaction mixture than by filtering it off under otherwise identical conditions, by a low concentration of the residue introduced into the hydrochloric acid recycled during the reaction, and by a high temperature during the heat treatment as well as by relatively long heat treatment durations. To remain economical, the reaction is carried out at concentrations of 200 to 300 g residue per liter of hydrochloric acid, and the heat treatment time is limited to 1 to 2 hours.

After the heat treatment, the hydrolysis residue can be safely disposed of in an environmentally compatible manner. The technical guidelines for special waste disposal in the Federal Republic of Germany require a maximum of 6% by weight chloride for waste products to be stored above ground. This requirement is met if the hydrolysis residue is heat-treated for 1 hour at 200° C. If it is desired to classify the hydrolysis residue in a higher grade waste stage, it is possible, for example, to obtain residual chloride values below 1% by weight by heat-treating the hydrolysis residue for 2 hours at a temperature of 300° C.

BRIEF DESCRIPTION OF DRAWING

The attached drawing is a schematic flow sheet of the novel process according to the present invention.

DETAILED DESCRIPTION OF THE INVENTION

Pre-dried distillation residue or a residue suspension is metered through line 1 into a stirring vessel 2 which has been filled through line 3 with previously recirculated hydrochloric acid. The reaction mixture is pumped during the hydrolysis through an external heat exchanger and a spray tower mounted on the stirring vessel. The hydrogen chloride generated by the reaction escapes through line 4 into a condenser 5 which is cooled with brine. The dry hydrogen chloride leaves the processing plant by way of line 10, and any condensate which may be formed in the condenser 5 flows through line 8 into a collecting vessel 6.

After completion of the reaction in vessel 2, the suspension reaction mixture is pumped through line 17 into a container 7 in which the suspension is allowed to stand in order to coagulate the solids. The contents of container 7 are then resuspended by moderate stirring, and the liquid and solid phases of the suspension are then separated in a centrifuge 9. The liquid phase flows through line 11 into collecting vessel 6, while the moist solid phase is fed into a mixer 12 in which the heat treatment takes place. The gaseous components released during the heat treatment are passed through line 13 into the condenser 16. The condensate produced in the condenser flows by way of line 8 into the collecting vessel 6. The dry solid is removed from the mixer 12 by way of line 14. The water consumed in the hydrolysis reaction can be replenished through line 15. For this purpose water can be added as such or in the form of hydrochloric acid. When hydrochloric acid is added, it can be economically concentrated to yield hydrogen chloride.

The process according to the present invention is customarily carried out at normal pressure. Depending upon the demands on the resulting hydrogen chloride and on the hydrolysis residue, it may be advantageous to perform the individual process steps at elevated or reduced pressure.

The following examples illustrate the present invention and will enable others skilled in the art to understand it more completely. It should be understood, however, that the invention is not limited solely to the particular examples given below.

EXAMPLE 1

200 g of a residue suspension from a chlorosilane distillation were stirred into a vessel containing 1 liter of hydrochloric acid which had been filtered off from prior runs. After allowing the reaction mixture to stand overnight, it was filtered through a pressure filter, yielding 584 g of a moist filter cake. The filter cake was heat-treated for 2 hours at 160° C., after which the residual chloride content of the dry filter cake was 8.1% by weight. When the moist filter cake was heat-treated for 2 hours at 230° C., the residual chloride content of the dry waste product was 2.8% by weight.

When the run was repeated with 300 g of residue suspension per liter of recirculated hydrochloric acid under otherwise identical conditions, the residual chloride content in the dry waste was 11.4% by weight after heat treatment at 160° C., and 3.2% by weight after heat treatment at 230° C.

EXAMPLE 2

The hydrolysis was carried out with 200 g of predried distillation residue per liter of recirculated hydrochloric acid, and the reaction mixture was allowed to stand for 4 hours. After filtering the suspension through a pressure filter, 502 g of a moist filter cake were obtained. Samples of the moist filter cake were heat-treated at 200° C. for 15, 30, 60 and 120 minutes, respectively. The residual chloride content of the dry samples was 20.6% by weight after 15 minutes, 11.6% by weight after 30 minutes, 5.2% by weight after 60 minutes, and 3.2% by weight after 120 minutes of heat treatment. When this procedure was repeated, except that the heat treatment was carried out at 230° C., the residual chloride content of the dry sample was 16.9% by weight after 15 minutes, 5.9% by weight after 30 minutes, 3.0% by weight after 60 minutes, and 2.2% by weight after 120 minutes of heat treatment.

When the temperature of the heat treatment was increased to 300° C., the residual chloride content of the dry samples was 5.7% by weight after 15 minutes, 2.0% by weight after 30 minutes, 1.2% by weight after 60 minutes, and 0.8% by weight after 120 minutes of heat treatment.

EXAMPLE 3

Example 2 was repeated, except that the solid was removed from the suspension by centrifuging. 332 g of a moist filter cake were obtained. Samples of this filter cake were subjected to heat treatment at 230° C. for 30, 60 and 120 minutes, respectively. The residual chloride content of the dry sample was 5.3% by weight after 30 minutes, 2.2% by weight after 60 minutes, and 1.5% by weight after 120 minutes of heat treatment.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. The method of processing the residue of a chlorosilane distillation, which comprises the steps of
    a) allowing the chlorosilane distillation residue to react in liquid hydrochloric acid accompanied by the generation of hydrogen chloride,
    b) allowing the reaction mixture formed in step a) to coagulate,
    c) removing the solid constituents of the coagulated reaction mixture and return the liquid component to step a),
    d) subjecting the moist solid components separated in step c) to a drying and heat treatment at a temperature of at least 140° C., and
    e) condensing the gaseous products released in step d) and recycling the condensate into step a).

2. The method of claim 1, wherein the heat treatment in step d) is applied to the moist solid for at least 15 minutes at 300° C., or at least 30 minutes at 230° C., or at least 60 minutes at 200° C.

3. The method of claim 1, wherein the water consumed in the hydrolysis reaction in step a) is replenished in the form of hydrochloric acid.

* * * * *